Patented Apr. 26, 1938

2,115,112

UNITED STATES PATENT OFFICE 2,115,112

GAS TURBINE SYSTEM

Alf Lysholm, Stockholm, Sweden, assignor to Aktiebolaget Milo, Stockholm, Sweden, a corporation of Sweden Application January 20, 1934, Serial No. 707,499
In Germany February 1, 1933

14 Claims. (Cl. 60—42)

The present invention relates to gas turbine systems and has particular reference to gas turbine systems of the continuous combustion type in which at least two rotationally independent turbines are employed which are serially connected with respect to flow of gaseous motive fluid through the turbines. Still more particularly, the invention relates to systems of the above kind in which gaseous motive fluid which has been expanded in a turbine for producing useful power is expanded further in a turbine driving compressor means for compressing air to be utilized as a constituent of the motive fluid for the turbines.

Systems of the above general character, which are particularly adapted to handle variable loads, are advantageously arranged so that the gaseous motive fluid is expanded first in a useful power turbine and expanded further in a compressor turbine after being reheated between the turbines. When the useful power turbine is not running under load, or when the load on this turbine is very small, the quantity of motive fluid supplied to the turbine is so small that the temperature of the motive fluid as exhausted from a useful power turbine is insufficient to reliably support combustion of additional fuel for the reheating of the motive fluid before it passes to a compressor turbine for subsequent expansion, and in the case of systems where reheating is not employed between turbines the quantity and temperature of the motive fluid as exhausted from the useful power turbine is insufficient to insure proper operation of a compressor turbine adapted to be operated by further expansion of such exhaust motive fluid.

The present invention has for its general object the provision of an improved gas turbine system of the above described general type which is adapted to operate satisfactorily and efficiently regardless of variations in load on the system, even though the load may drop to zero so that the system must run idly.

The manner in which the above general object and other and more detailed objects are attained, and the more detailed nature of the invention may best be understood by consideration of the following description of suitable forms of apparatus for carrying the invention into effect, which are illustrated in the accompanying drawings forming a part of this specification.

Figure 1:
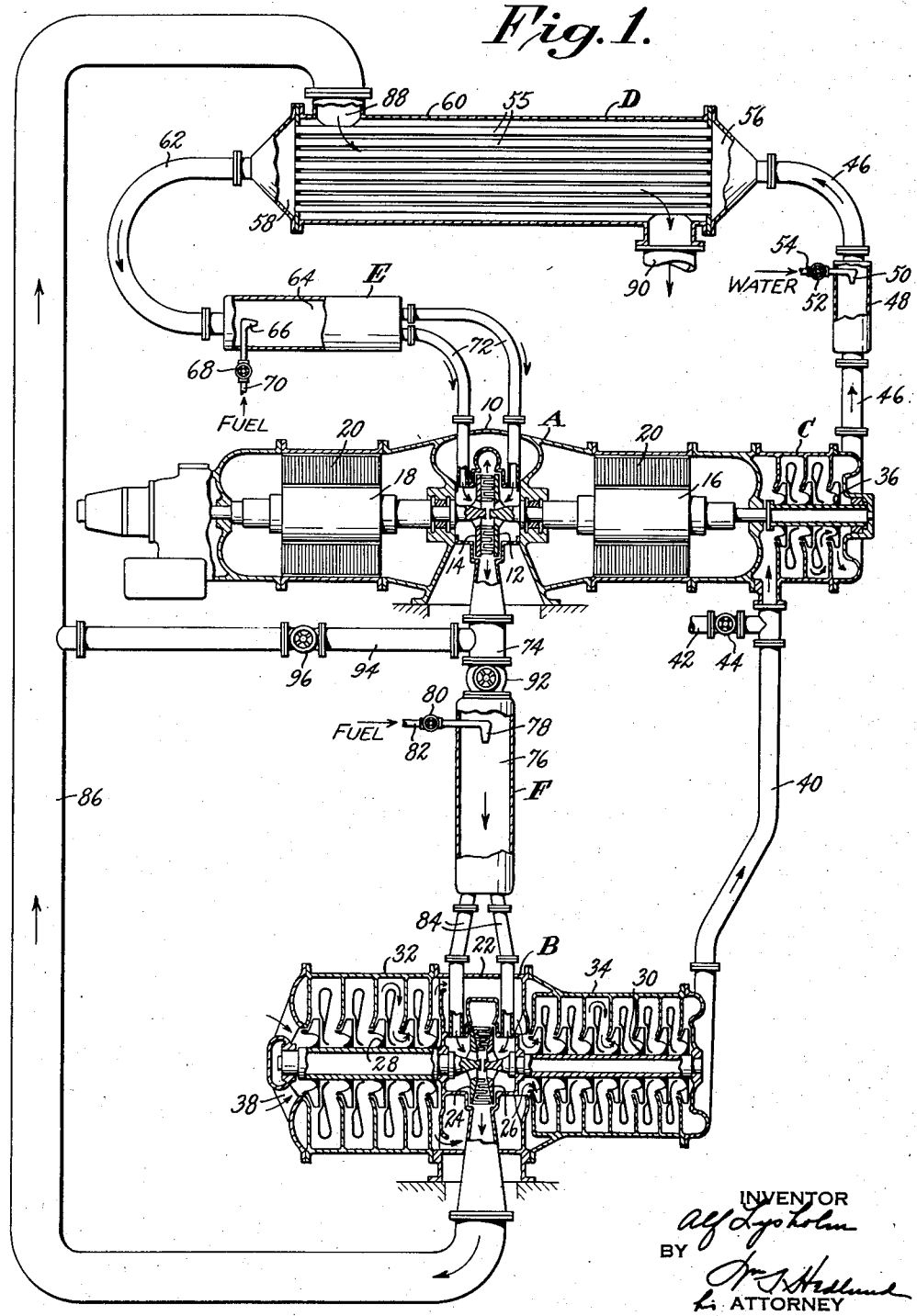
Fig. 1 is a more or less diagrammatic view partly in section of a gas turbine system embodying the invention.

Referring now to Fig. 1, reference character A designates generally a useful power turbine unit which, in the illustrated form comprises a double rotation radial flow turbine 10 having oppositely rotating rotors 12 and 14 for driving respectively the rotors 16 and 18 of a two-part electric generator designated generally at 20, the output of which constitutes the useful power produced by the system.

Insofar as the present invention is concerned, the useful power produced by the system may take other forms.

A compressor turbine unit, designated generally at B, comprises a second double rotation radial flow turbine 22, the oppositely rotating rotors 24 and 26 of which serve to drive respectively the rotors 28 and 30 of compressor sections 32 and 34, which for purposes of convenience may be considered as a low pressure compressor.

While for purposes of illustration the turbines have been shown as of the double rotation radial flow type, other types of turbines may be employed within the scope of the invention.

A third compressor section C is provided, the rotor 36 of which is driven by one of the shafts of the useful power turbine unit A. The compressor section C, as will hereinafter more fully appear, operates at some times as a high pressure compressor and at other times as a low pressure compressor taking air directly from the atmosphere, and for purposes of convenie. may be considered as a secondary compressor. Air is admitted to the compressor section 32 through the atmospheric air inlet 38 and passes serially through the compressor sections 32 and 34 to the conduit 40 connecting the outlet of compressor section 34 with the inlet of the compressor section C. A conduit 42 open to the atmosphere and controlled by valve 44 connects with conduit 40 on the inlet side of the compressor section C. A conduit 46 delivers compressed air from the compressor section C to a regenerator designated generally at D and interposed in this conduit is a cooling chamber 48, into which water may be injected through nozzle 50 under the control of valve 52 in the water supply line 54.

The regenerator D illustrated comprises a surface type heat exchanger having a plurality of tubes 55, communicating at their ends with suitable header chambers 56 and 58 and enclosed by the outer shell or casing 60 of the device. Air passes by way of conduit 62 from the outlet chamber 58 of the regenerator D to a heater E having a combustion chamber 64 to which fuel is admitted through nozzle 66 under the control of valve 68 in the fuel supply line 70. The gaseous motive fluid resulting from combustion in the chamber 64 is delivered through the supply conduits 72 to turbine 10 and the motive fluid exhausted from this turbine flows through the conduit 74 to a reheater F, to which fuel is admitted through nozzle 78 under the control of valve 80 in the fuel supply line 82. From the reheater F motive fluid is conducted by means of pipes 84 to the compressor turbine 22, and from this turbine the exhaust motive fluid flows by way of conduit 86 to the inlet 88 of the space around the tubes 55 in the regenerator D. From this space the motive fluid is finally exhausted through the outlet conduit 90.

A valve 92 is provided in the exhaust conduit 74 connecting turbine 10 with the reheater F and between turbine 10 and valve 92 a conduit 94 is provided connecting conduit 74 with conduit 86. Flow through conduit 94 is controlled by means of valve 96.

Under normal or full load operating conditions the above described system operates as follows: Valves 44 and 96 are closed and valve 92 is open. Air is drawn into the compressor section 32 and is progressively compressed in the three serially connected compressor sections 32, 34 and C. From C the finally compressed air, which is at relatively high temperature due to compression, passes to the cooler 48, where it is cooled to a relatively low temperature by evaporation of water injected through nozzle 50. The relatively cool air then passes through the regenerator D, where it is heated by the heat absorbed from the exhaust motive fluid delivered to the regenerator through conduit 86. The heated air then flows to the heater E, where it is burned with fuel supplied through nozzle 66 to produce the heated and compressed gaseous motive fluid which is delivered to turbine 10 through the pipes 72.

In the particular form of apparatus illustrated, the amount of fuel supplied to nozzle 66 is such that the gaseous products of combustion leaving the heater E contain a considerable quantity of excess air, the excess air serving to prevent the temperature of the gases from rising to an undesirably high degree, and providing oxygen for combustion of the fuel supplied to the reheater F.

The exhaust gases leaving the turbine 10 at reduced temperature and pressure pass through the open valve 92 to the reheater F, where the temperature of the gases is again elevated to the desired value by combustion of additional fuel supplied through nozzle 78. The reheated gases at reduced pressure are then further expanded in the compressor turbine 22 and exhausted to final discharge through the regenerator D, which serves to recover a substantial portion of the heat of the exhaust gases, since the air as admitted to the reheater through conduit 46 is at relatively low temperature.

Control of the system in accordance with variations in load is effected by controlling the amount of fuel supplied to the combustion chambers, and such control may be manual in accordance with any suitable load indicator, or may be effected through any one of a number of known kinds of speed or load responsive devices which need not be described herein for an understanding of the present invention.

It will be evident that as the load on the system drops the amount of fuel supplied to the heater E must be decreased, and if the load falls to a sufficiently low value it will be evident that the amount of fuel supplied to the heater E will eventually be cut down to an amount such that the temperature of the motive fluid, after it has been expanded and cooled during its passage through the turbine 10, will be too low to insure reliability of combustion of fuel supplied for reheating purposes to the reheater F. It will further be evident that in the event of failure of combustion in the reheater F under low load or no load conditions of operation, the heat energy of the motive fluid as delivered to the compressor turbine 22 will be insufficient to effect operation of this turbine, and, as a consequence, failure of the entire system to operate will ensue. In accordance with the present invention, this possibility of failure of operation is eliminated through the provision of the compressor section C, which is driven by the useful power turbine 10. When the load drops to a no load value or a predetermined low load value, valve 92 is closed and valves 96 and 44 are opened. The compressor section C then commences operation as a low pressure compressor, and in the illustrated embodiment of the invention as the sole compressor, while the exhaust gases from the turbine 10 are delivered directly from conduit 74 to the regenerator D, through conduit 94 and a portion of the main exhaust conduit 86. Under these conditions of operation, the compressor section C delivers air at lower pressure than when this section is operating in series with the compressor unit B, but the motive fluid at lower pressure delivered by the compressor section C alone, when heated by combustion of fuel in the heater E, has sufficient energy to drive turbine 10 under the assumed conditions of no load or very low load on the system.

Figure 2:
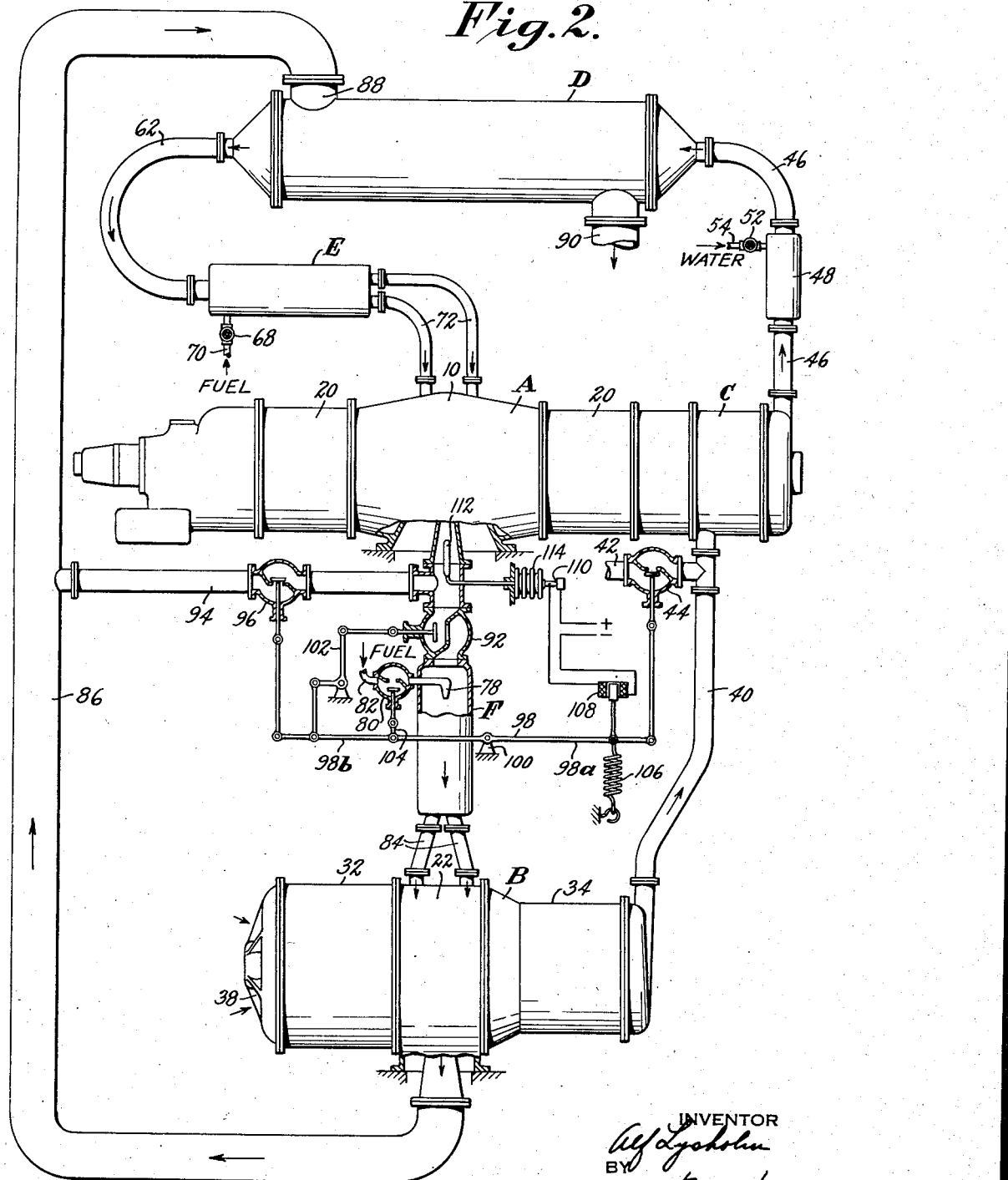
Fig. 2 is a view similar to Fig. 1 showing the system illustrated in Fig. 1 with automatic control for effecting operation of the system in accordance with the invention.

The control of the valves which determine the manner in which the compressor section C is employed may be effected in any suitable manner, and the valves may be manipulated manually by the operator or operators of the system in accordance with the usual load indicators associated with the control of apparatuses of this kind. Control of the valves may also be made automatic in response to variations in load. Numerous controls will suggest themselves to those skilled in the art, but for purposes of illustration there is shown in Fig. 2, in more or less diagrammatic form, one means for effecting the desired control directly in response to exhaust gas temperature conditions at the outlet of the useful power turbine 10. In the arrangement illustrated, valves 44 and 96 are mechanically interconnected by means of a linkage comprising a lever 98 pivoted at 100 and having arms 98a and 98b connected respectively with valves 44 and 96, so that upon movement of the lever about its pivot these valves are either closed or opened simultaneously depending upon the direction of movement of the lever. The arm 98b of lever 98 is connected by means of the bell crank linkage 102 to valve 92, so that movement of the lever 98 closes valve 92 when valve 96 is opened, and vice versa. The lever arm 98b is also advantageously connected by link 104 to the fuel supply valve 80 associated with the reheater F, the arrangement being such that the fuel supply valve is closed and opened with valve 92. Movement of lever 98, for the desired reversal of position of the several valves, is, in the present embodiment, effected through the medium of spring 106 acting in opposition to an electric solenoid 108 adapted to be energized from any suitable source of electric power upon the closing of the contact points indicated generally at 110. A thermostat element 112 is located in the exhaust conduit leading from turbine 10 and is filled with the usual expansible fluid adapted to actuate a bellows diaphragm 114, or other suitable expansion element, to open and close the contact points 110. From the drawing, it will be evident that if the contact points 110 are open, spring 106 will act to depress the lever arm 98a, thus opening valves 44 and 96, and closing valves 92 and 80, and the thermostat arrangement is accordingly adjusted so that when the temperature of the gases exhausted from turbine 10 is too low to insure reliable combustion in the reheater F, the contact points are opened. Under normal operating conditions which impose full load on the system, or a substantial load, the temperature of the exhaust gases is sufficient to cause the thermostat 112 to keep the contacts 110 closed, and the solenoid 108 operates to maintain the valve control in a position in which valves 44 and 96 are closed and valves 92 and 80 are opened.

While for purposes of illustration the shifting of the positions of the valves has been shown as being effected in response to variations in the temperature of the exhaust of the useful power turbine, it will be evident to those skilled in the art that other control or regulating impulses indicative of variations in the load on the system may be used with equal facility to govern the operation of these valves.

Figure 3:
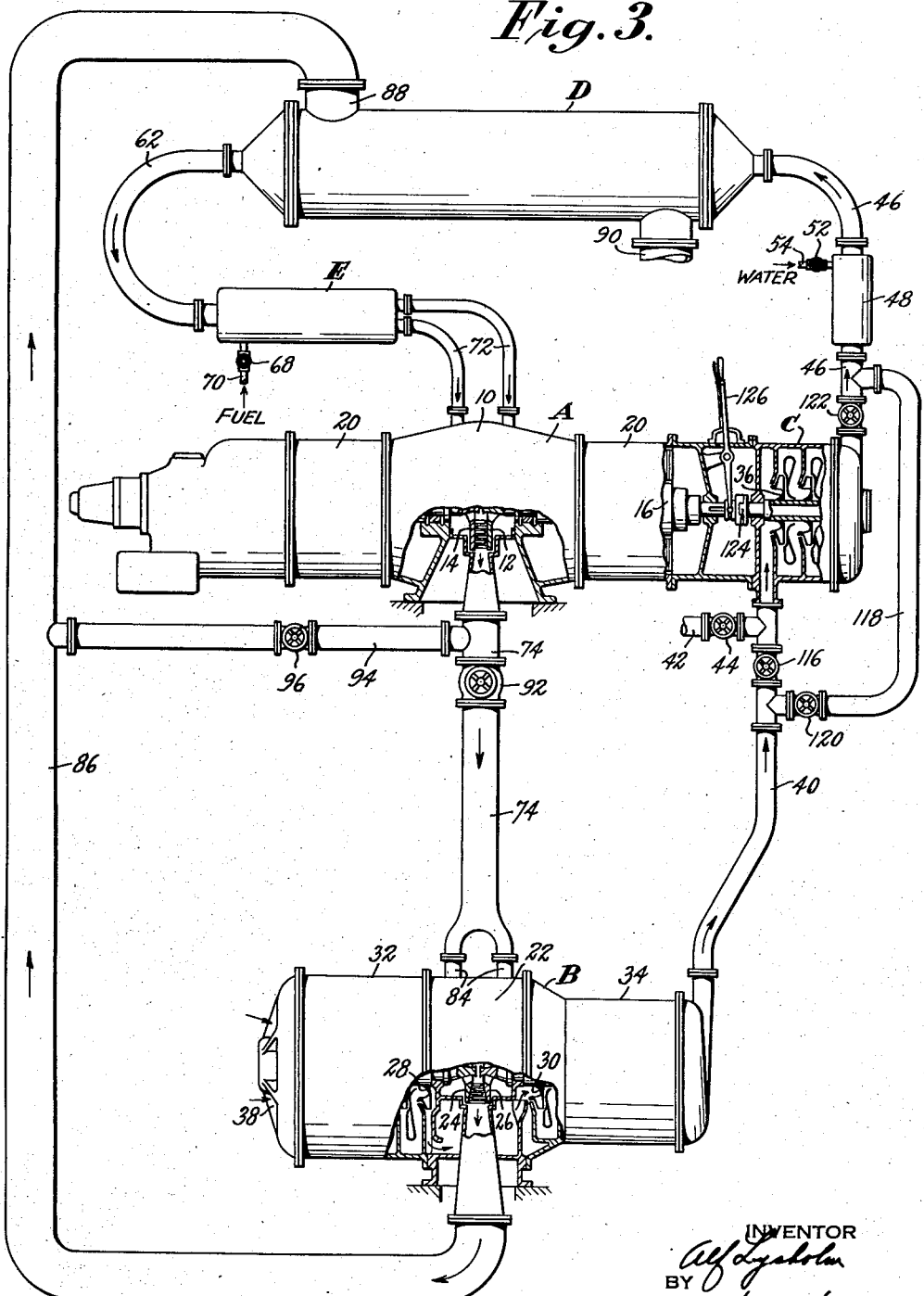
Fig. 3 is a view similar to Fig. 1 showing a gas turbine system having a different arrangements of parts for carrying the invention into effect.

Turning now to Fig. 3, a somewhat different arrangement is shown. In this embodiment, the useful power turbine 10 exhausts motive fluid directly through conduit 74 to the compressor turbine 22 without reheating of the motive fluid between turbines, and when the load on the system drops below a predetermined value the resulting decrease in the amount of fuel supplied to the heater E under the control of valve 68 reduces the energy in the motive fluid to a degree such that the exhaust from turbine 10 has insufficient energy to effect proper operation of turbine 22. In order to take care of this condition, the valve 92 is provided in conduit 74, and the conduit 94, controlled by valve 96, is provided for connecting conduit 74 on the inlet side of valve 92 with the exhaust conduit 86. This arrangement is similar to that shown in the preceding figures. The air inlet conduit 42 with the control valve 44 is also provided for admitting air directly to the compressor section C, as shown in the embodiment illustrated in Fig. 1. In addition, in the present arrangement, a valve 116 is provided in conduit 40 between the air inlet conduit 42 and the outlet of the compressor section 34, and between valve 116 and the outlet of this compressor section conduit 118 is provided connecting the conduit 40 with the outlet conduit 46 between the outlet of the compressor section C and the cooler 48. Flow through conduit 118 is controlled by valve 120 and valve 122 is provided in the conduit 46 between the outlet of the compressor section C and the outlet end of conduit 118. In the present arrangement the compressor section C is connected to the shaft of the turbine 10 through a releasable coupling which may be of any suitable form, and which is shown diagrammatically as comprising a dog or jaw clutch 124 adapted to be engaged or disengaged by manipulation of the manual control lever 126.

This embodiment provides for selective operation of the system in different ways in order to take care of different load conditions to the best advantage. Under full load operating conditions, valves 44, 96, and 120 are closed and valves 92, 116 and 122 are opened. The clutch 124 is engaged. Under these conditions the compressor section C operates as a high pressure compressor, and air at maximum pressure is delivered to the heater E for forming motive fluid having the maximum available amount of energy for operating the turbines.

At intermediate loads the compressor section C can be cut out by closing valves 116 and 122 and opening valve 120, thus by-passing this compressor section and causing air at lower pressure to be delivered from the compressor section 32. When operating in this manner, the coupling 124 is advantageously released to reduce windage loss, which would otherwise be caused by idle rotation of the compressor section C. If increased volume of air at lower than maximum pressure is desired, valves 44 and 122 may be opened to cause the compressor section C to operate in parallel with the compressor unit B. Finally, for no load or very low load operation, valves 92 and 120 are closed and valves 44, 96 and 122 are opened, thus cutting out the compressor unit B and causing air to be supplied by the compressor section C operating as a low pressure compressor. Under these conditions the coupling 124 is of course engaged. With valve 120 closed and valve 44 open, it is not essential that valve 116 also be closed, but this valve may also be closed.

It will be evident that many different known kinds of regulating apparatus may be employed in the event it is desired to manipulate the several valves in this embodiment automatically, and it will also be evident that the operation of the system in accordance with the present invention may be effected by manual manipulation of the valves in accordance with conditions as indicated by the usual load indicating instruments associated with systems of the character under discussion.

In the operation of turbine systems of the character under consideration, improved thermal efficiency is obtained by the injection of water or other heat interchange arrangements which provide for recovery of heat absorbed in the cooling process. This is because the cooling of the compressed air to a relatively low temperature permits of the recovery of a relatively large proportion of the heat of the exhaust motive fluid from which heat can be extracted in a regenerator at a relatively low temperature level. It is to be noted that the present invention provides for this desirable treatment of the compressed air under all conditions of plant operation, and regardless of whether all or only part of the compressor apparatus is in operation. Thus, when the compressor section C is operating alone, the air from this compressor section is cooled before going to the regenerator in the same manner as when this compressor section operates as a high pressure compressor section for further compressing air initially compressed in the compressor unit B.

While for purposes of illustrating and explaining the invention gas turbine systems have been shown in which only one useful power turbine and one compressor turbine are employed, and in which only one compressor section driven from a useful power turbine is used, it will be evident that the invention is applicable to other arrangements of gas turbine systems employing a larger number of turbines and a larger number of compressor sections. It will also be understood that the terms water and air as used herein need not be considered in a limiting sense, since other media for compression to be used as a constituent of motive fluid and other cooling media may be employed within the scope of the invention. Furthermore, the terms low and high pressure as applied to the compressor sections are to be understood as used in their relative rather than their absolute sense.

The invention is accordingly not to be considered as limited in any sense to the specific forms of apparatus herein disclosed by way of illustration, but is to be considered as embracing all forms of apparatus falling within the scope of the appended claims when they are construed as broadly as is consistent with the state of the prior art.

What I claim is:

1. In a gas turbine system of the continuous combustion type, a useful power turbine, a compressor turbine rotationally independent of the useful power turbine, compressor elements separately driven by said turbines for compressing air to be used in motive fluid for the turbines, conduit means for supplying motive fluid to said turbines connecting said compressor elements so that compressed air can be supplied by both of said compressor elements or only by the compressor element driven by the useful power turbine, valves for controlling flow of fluid through said conduit means, and means responsive to an impulse indicative of the value of the load on the system for actuating said valves to cause motive fluid to be shut off from said compressor turbine and for causing air to be supplied only by the compressor element driven by the useful power turbine when the load on the system is below a predetermined value.

2. In a gas turbine system of the continuous combustion type, a useful power turbine, a compressor turbine rotationally independent of the useful power turbine, a first conduit for conducting exhaust motive fluid from the useful power turbine to the compressor turbine, a valve in said conduit, a second conduit for conducting exhaust motive fluid from the useful power turbine, a valve in said second conduit, a compressor element driven by said compressor turbine, a compressor element driven by said useful power turbine, a conduit connecting said compressor elements, an internal combustion heater for producing motive fluid, a conduit for conducting motive fluid produced in said heater to the useful power turbine, a conduit connecting the second mentioned compressor element with said heater, a conduit providing a direct inlet for the second mentioned compressor element, a valve in the last mentioned conduit, and means responsive to an impulse indicative of the value of the load on the system for opening the second mentioned and the last mentioned valves and closing the first mentioned valve when the load on the system falls below a certain value and for operating the valves in reverse manner when the load on the system is above said certain value.

3. In a gas turbine system of the continuous combustion type, a useful power turbine, a compressor turbine rotationally independent of the useful power turbine, compressor elements separately driven by said turbines, two separate conduits for conducting exhaust motive fluid from the useful power turbine, one of said conduits communicating with the inlet of the compressor turbine, valves in said conduits, means responsive to an impulse indicative of the value of the load on the system for closing said valves in alternation, said means operating to close the one of said conduits communicating with the compressor turbine when the load on the system falls below a certain value, said compressor elements being connected for series compression with the element driven by the useful power turbine effecting final compression, and means for admitting air at atmospheric pressure to the last mentioned compressor element when the conduit for supplying motive fluid to the compressor turbine is closed.

4. In a gas turbine system of the continuous combustion type, a useful power turbine, a compressor turbine rotationally independent of the useful power turbine, a heater for producing gaseous motive fluid, a conduit for conducting motive fluid from said heater to the useful power turbine, a conduit for conducting exhaust motive fluid from the useful power turbine to the compressor turbine, a valve in the second mentioned conduit, a low pressure compressor driven by the compressor turbine, a secondary compressor driven by the useful power turbine, a regenerator, a conduit for conducting exhaust motive fluid from the compressor turbine to the regenerator, a by-pass conduit for conducting motive fluid exhausted from the useful power turbine directly to the regenerator, a valve in said by-pass conduit, a conduit including said regenerator connecting the secondary compressor with said heater, a conduit connecting the low pressure compressor with the secondary compressor, a conduit providing a direct air inlet for the secondary compressor, a valve in the last mentioned conduit, and means responsive to an impulse indicative of the value of the load on the system for closing the first mentioned valve and opening the second and third mentioned valves when the load on the system is below a predetermined value.

5. In a gas turbine system of the continuous combustion type, a useful power turbine, a compressor turbine rotationally independent of the useful power turbine, a heater for producing gaseous motive fluid, a conduit for conducting motive fluid from said heater to the useful power turbine, a conduit for conducting exhaust motive fluid from the useful power turbine to the compressor turbine, a valve in the second mentioned conduit, a low pressure compressor driven by the compressor turbine, a secondary compressor driven by the useful power turbine, a regenerator, a conduit for conducting exhaust motive fluid from the compressor turbine to the regenerator, a by-pass conduit for conducting motive fluid exhausted from the useful power turbine directly to the regenerator, a valve in said by-pass conduit, a cooler for cooling compressed air by injection of a cooling medium therewith, a conduit including said cooler and said regenerator in the order named connecting the secondary compressor with said heater, a conduit connecting the low pressure compressor with the secondary compressor, a conduit providing a direct air inlet for the secondary compressor, and means responsive to an impulse indicative of the value of the load on the system for closing the first mentioned valve and opening the second and third mentioned valves when the load on the system is below a predetermined value.

6. In a gas turbine system of the continuous combustion type, a useful power turbine, a compressor turbine rotationally independent of the useful power turbine, a combustion chamber for producing pre-formed gaseous motive fluid for expansion in the turbines, a conduit connecting the combustion chamber with the useful power turbine, a conduit for conducting exhaust motive fluid from the useful power turbine to the compressor turbine, a valve in the second mentioned conduit, a regenerator, a conduit for conducting exhaust motive fluid from the compressor turbine to the regenerator, a by-pass conduit for conducting exhaust motive fluid from the useful power turbine directly to the regenerator, a valve in said by-pass conduit, a low pressure compressor driven by the compressor turbine, a secondary compressor, said compressors compressing air through a pressure range substantially the same as the range of expansion of motive fluid in the turbines, means including a releasable coupling for driving the secondary compressor from the useful power turbine, a conduit including said regenerator connecting the secondary compressor with said heater, a valve in the last mentioned conduit between the compressor and the heater, a conduit connecting the low pressure compressor and the secondary compressor, a valve in the last mentioned conduit, a by-pass conduit for delivering air from the low pressure compressor to the regenerator without further compression in the secondary compressor, a valve in the second mentioned by-pass conduit, a conduit providing a direct air inlet for the secondary compressor, and a valve in the last mentioned conduit.

7. In a gas turbine system of the continuous combustion type, a useful power turbine, a compressor turbine rotationally independent of the useful power turbine, a combustion chamber for producing pre-formed gaseous motive fluid for expansion in the turbines, a conduit connecting the combustion chamber with the useful power turbine, a conduit for conducting exhaust motive fluid from the useful power turbine to the compressor turbine, a valve in the second mentioned conduit, a regenerator, a conduit for conducting exhaust motive fluid from the compressor turbine to the regenerator, a by-pass conduit for conducting exhaust motive fluid from the useful power turbine directly to the regenerator, a valve in said by-pass conduit, a low pressure compressor driven by the compressor turbine, a secondary compressor, said compressors compressing air through a pressure range substantially the same as the range of expansion of motive fluid in the turbines, means including a releasable coupling for driving the secondary compressor from the useful power turbine, a cooler for cooling compressed air by injection of a cooling fluid therewith, a conduit including said cooler and said regenerator in the order named connecting the secondary compressor with said heater, a valve in the last mentioned conduit between the compressor and the cooler, a conduit connecting the low pressure compressor and the secondary compressor, a valve in the last mentioned conduit, a by-pass conduit for conducting air from the low pressure compressor to said cooler without further compression in the secondary compressor, a valve in the by-pass conduit, a conduit providing a direct air inlet for the secondary compressor and a valve in the last mentioned conduit.

8. That improvement in the operation of a gas turbine system of the continuous combustion type having a useful power turbine and a rotationally independent compressor turbine serially connected with respect to flow of motive fluid in the order named and compressor elements driven by said turbines, which consists in operating both of said turbines and utilizing both of said compressor elements to compress air to be used as a constituent of the motive fluid for driving the turbines when the load on the system is above a predetermined value, and operating the useful power turbine alone and admitting atmospheric air to the compressor element driven by the useful power turbine when the load on the system is below said predetermined value.

9. In a gas turbine system of the continuous combustion type, a useful power turbine, a compressor turbine, a conduit for conducting exhaust motive fluid from the useful power turbine to the compressor turbine, a reheater in said conduit and a valve for closing the conduit between the useful power turbine and the reheater, an exhaust conduit communicating with the first mentioned conduit at a place between the useful power turbine and said valve, a valve for closing the second mentioned conduit, a compressor element driven by the compressor turbine, a compressor element driven by the useful power turbine, a combustion chamber, means for supplying fuel continuously to said chamber to continuously produce motive fluid for expansion in said turbines by combustion with air supplied to the chamber, a conduit for delivering motive fluid produced in said combustion chamber to the useful power turbine, a conduit connecting said compressor elements in series and a conduit connecting the compressor element driven by the useful power turbine with said combustion chamber whereby to deliver air to said chamber from said compressors at a pressure substantially the same as the initial pressure from which the motive fluid is expanded in said turbines, a conduit providing an inlet for atmospheric air to the compressor element driven by the useful power turbine, and a valve in the last mentioned conduit.

10. In a gas turbine system of the continuous combustion type, a useful power turbine, a compressor turbine rotationally independent of the useful power turbine, a first compressor element driven by the compressor turbine, a second compressor element driven by the useful power turbine, a releasable coupling between the second compressor element and the useful power turbine, a combustion chamber, means for supplying fuel continuously to said chamber to continuously produce motive fluid for expansion in said turbines by combustion with air supplied to the chamber, said compressor elements compressing the air through a pressure range substantially the same as the range through which the motive fluid is expanded, and valved conduits for selectively connecting said compressor elements in series with respect to the medium compressed with said second compressor element effecting final compression, or in parallel with respect to said flow.

11. In a gas turbine system of the continuous combustion type, a useful power turbine, a compressor turbine rotationally independent of the useful power turbine, a combustion chamber for producing motive fluid for said turbine, means for continuously supplying fuel to said chamber to produce motive fluid for expansion in said turbine by combustion with the air supplied to the chamber, a regenerator, a first compressor element driven by the useful power turbine, a second compressor element driven by the compressor turbine, said compressor elements compressing air through a pressure range substantially the same as the range of expansion of motive fluid in said turbines, conduit means for conducting air from both of said compressor elements to said regenerator, a cooler in said conduit means for cooling the air delivered to said regenerator by injection of a cooling fluid therewith, a conduit for delivering air from the regenerator to the combustion chamber, conduit means for delivering motive fluid from the combustion chamber to the turbines, conduit means for conducting exhaust motive fluid to the regenerator, and valves in the first mentioned conduit means for selectively operating said first compressor element as a low pressure compressor or as a high pressure compressor in series with said first compressor element.

12. In a gas turbine system of the continuous combustion type, a useful power turbine, a compressor turbine rotationally independent of the useful power turbine, a combustion chamber for producing gaseous motive fluid for expansion in the turbines, means for supplying fuel continuously to said chamber, a conduit for conducting motive fluid from said combustion chamber to the useful power turbine, a conduit for conducting exhaust motive fluid from the useful power turbine to the compressor turbine, a valve in the second mentioned conduit, a low pressure compressor driven by the compressor turbine, a secondary compressor driven by the useful power turbine, said compressors compressing air through a pressure range substantially the same as the range of expansion of the motive fluid in said turbines, a regenerator, a conduit for conducting exhaust motive fluid from the compressor turbine to the regenerator, a by-pass conduit for conducting motive fluid exhausted from the useful power turbine directly to the regenerator, a valve in said by-pass conduit, a conduit including said regenerator connecting the secondary compressor with said heater, a conduit connecting the low pressure compressor with the secondary compressor, a conduit providing a direct air inlet for the secondary compressor, and a valve in the last mentioned conduit.

13. In a gas turbine system of the continuous combustion type, a useful power turbine, a compressor turbine rotationally independent of the useful power turbine, a combustion chamber for producing gaseous motive fluid for expansion in the turbines, means for supplying fuel continuously to said chamber, a conduit for conducting motive fluid from said combustion chamber to the useful power turbine, a conduit for conducting exhaust motive fluid from the useful power turbine to the compressor turbine, a valve in the second mentioned conduit, a low pressure compressor driven by the compressor turbine, a secondary compressor driven by the useful power turbine, said compressors compressing air through a pressure range substantially the same as the range of expansion of the motive fluid in said turbines, a regenerator, a conduit for exhausting motive fluid from the compressor turbine to the regenerator, a by-pass conduit for conducting motive fluid exhausted from the useful power turbine directly to the regenerator, a valve in said by-pass conduit, a cooler for cooling compressed air by injection of a cooling medium therewith, a conduit including said cooler and said regenerator in the order named connecting the secondary compressor with said combustion chamber, a conduit connecting the low pressure compressor to the secondary compressor, a conduit providing a direct air inlet for the secondary compressor, and a valve in the last mentioned conduit.

14. That improvement in the operation of a gas turbine system of the continuous combustion type having a useful power turbine and a rotationally independent compressor turbine serially connected with respect to flow of motive fluid in the order named and compressor elements driven by said turbines, which consists in compressing air in both of said compressor elements when the load on the system is above a pre-determined value to a pressure substantially the same as that of the initial pressure from which the motive fluid is expanded, heating the compressed air to form motive fluid by combustion of fuel therewith and expanding the motive fluid serially through the useful power turbine and the compressor turbine to supply said compressor elements, and, when the load on the system is below said pre-determined value, admitting atmospheric air to the compressor element driven by the useful power turbine, compressing the air in the last mentioned turbine element to a pressure substantially the same as the initial pressure of the motive fluid, heating the compressed air by combustion of fuel therewith, expanding the motive fluid from its initial pressure in said useful power turbine alone and exhausting the motive fluid from the useful power turbine to atmosphere.

ALF LYSHOLM.